United States Patent
Philipp et al.

(10) Patent No.: US 11,784,034 B2
(45) Date of Patent: Oct. 10, 2023

(54) METHOD AND DEVICE FOR ANALYSING SIMS MASS SPECTRUM DATA

(71) Applicant: LUXEMBOURG INSTITUTE OF SCIENCE AND TECHNOLOGY (LIST), Esch-sur-Alzette (LU)

(72) Inventors: Patrick Philipp, Steinsel (LU); Tom Wirtz, Grevenmacher (LU)

(73) Assignee: LUXEMBOURG INSTITUTE OF SCIENCE AND TECHNOLOGY (LIST), Esch-sur-Alzette (LU)

( * ) Notice: Subject to any disclaimer, the term of this patent is extended or adjusted under 35 U.S.C. 154(b) by 311 days.

(21) Appl. No.: 17/415,861

(22) PCT Filed: Dec. 23, 2019

(86) PCT No.: PCT/EP2019/086920
§ 371 (c)(1),
(2) Date: Jun. 18, 2021

(87) PCT Pub. No.: WO2020/128092
PCT Pub. Date: Jun. 25, 2020

(65) Prior Publication Data
US 2022/0076935 A1    Mar. 10, 2022

(30) Foreign Application Priority Data

Dec. 21, 2018 (EP) .................................... 18215220
Jan. 16, 2019 (LU) .................................... LU101095

(51) Int. Cl.
*H01J 49/00*    (2006.01)
*G01N 23/2258*    (2018.01)

(52) U.S. Cl.
CPC ...... *H01J 49/0036* (2013.01); *G01N 23/2258* (2013.01)

(58) Field of Classification Search
CPC ............ H01J 49/0036; G01N 23/2258; G01N 2223/345
USPC .................................................. 250/281, 282
See application file for complete search history.

(56) References Cited

PUBLICATIONS

Green, et al ("Identification of complex molecules at surfaces: G-SIMS and SMILES fragmentation pathways," Intl. J. Mass Spectrom., vol. 272, No. 1, Jan. 20, 2008) (Year: 2008).*
International Search Report, PCT/EP2019/086920 dated Apr. 6, 2020, 2 pages.
Jimmy Moore, "Computational approaches for the interpretation of ToF-SIMS data", Mar. 20, 2014, XP055635420, Thesis Submitted to the University of Manchester for the Degree of Doctor of Philosophy in the Department of Chemical Engineering and Analytical Science (CEAS), 169 pages.
Green, et al.,"Identification of Complex Molecules at Surfaces: G-SIMS and SMILES Fragmentation Pathways", International Journal of Mass Spectrometry, Elsevier Science Publishers, vol. 272, No. 1, Jan. 20, 2008, 10 pages.

* cited by examiner

*Primary Examiner* — Michael Maskell
(74) *Attorney, Agent, or Firm* — Rankin, Hill & Clark LLP

(57) ABSTRACT

A method for analyzing secondary ion mass spectrum data representing respective secondary ion counts for a range of masses at a given mass resolution. The mass spectrum data is obtained by Secondary Ion Mass Spectrometry, SIMS. Automatic quantification of the ion species and/or cluster ions detected in the analyzed spectrum data is provided.

17 Claims, 2 Drawing Sheets

METHOD AND DEVICE FOR ANALYSING SIMS MASS SPECTRUM DATA

TECHNICAL FIELD

The invention lies in the field of Secondary Ion Mass Spectrometry, SIMS. In particular, the invention concerns a method and a device for analysing SIMS mass spectrum data.

BACKGROUND OF THE INVENTION

With the progress of miniaturisation, driven by future needs in various fields within materials and life science, the 3D analysis of devices and material structures becomes increasingly challenging. As a consequence, the interest in performing bimodal or even multimodal nano-analysis has increased during the last decade. In particular, nano-analytical techniques and instruments providing both excellent spatial resolution and high-sensitivity chemical information are of utmost importance for investigations at the nanoscale.

It is known to use Secondary Ion Mass Spectrometry, SIMS, devices for analytical and imaging purposes. In known SIMS devices, a focused primary ion beam is used to illuminate the surface of a sample. Thereby, material is sputtered from the sample, which creates localised secondary ion emissions stemming from the sample. These secondary ions can be analysed by different kinds of spectrometers. Generally, the secondary ions are first filtered in accordance with their mass-to-charge ratio, and then detected, classified or imaged accordingly. Other modes comprise the recoding of a mass spectrum or of a depth profile of the sample.

Owing in particular to its excellent sensitivity, its high dynamic range, its good depth resolution and its ability to differentiate between isotopes, SIMS constitutes a powerful technique for analysing sample surfaces and thin films. The fundamental lateral information limit in SIMS is determined by the area at the surface from which secondary ions are emitted. This depends both on the primary beam parameters (ion species, energy) and on the sample composition. For primary ion beams with energies in the range of a few keV up to a few tens of keV and masses from 4 up to 133 amu, this area is between 2 and 10 nm. Currently, the imaging resolution on commercial SIMS instruments is limited by the probe size of the primary beam rather than such fundamental considerations. In practice, resolutions in the 50 nm range are currently possible on the Cameca NanoSIMS 50™ instrument, which is capable of producing 2D elemental mappings with a lateral resolution of around 50 nm, as well as 3D elemental reconstructions of the analysed volume. As a consequence, new fields of application for SIMS, e.g. in life sciences, nanotechnologies and astronomy, are emerging. In addition, the possibility of detecting isotopes opens still other horizons, mainly in life sciences, where isotopic labelling is an important investigative technique.

In SIMS, secondary ions are extracted from the sample by applying a voltage difference between the sample and an extraction electrode. Depending on the application, three different types of mass spectrometers are used in SIMS. Quadrupole mass spectrometers have the lowest mass resolution and transmission and therefore are therefore of lesser interest for the present invention. Time-of-flight, ToF, mass spectrometers are mostly used for the detection of molecular fragments or even whole molecules, as this technique leads to an unlimited mass range. Mass measurement occurs through the measurement of the flight time of the secondary ions between a given origin, e.g. the sample, and the detector. The flight time is initiated by a pulse of the primary or secondary ion beam. In modern ToF mass spectrometers equipped with electrostatic mirrors for the correction of flight time differences for ions having the same mass but a different energy (arising from the energy distribution of sputtered ions), mass resolutions $M/\Delta M$ of 10 000 are easily obtained.

Compared to ToF mass spectrometers, magnetic sector mass spectrometers present the advantage of continuous analysis removing the duty cycle induced by beam pulsing, which leads to better overall sensitivities if the primary ion beam is operated in the DC mode, or to better overall sensitivities for similar analysis times if the primary ion beam is pulsed. However, they typically present a reduced mass range, limiting their application to the analysis of monatomic and small cluster ions. In a double focus magnetic sector instrument, achromatic mass filtering (i.e., filtering that is independent of the initial energy distribution of the secondary ions) is achieved by combining an electrostatic analyser with the magnetic filter. In most known magnetic mass spectrometers, the magnetic field must be tuned for a selected mass to reach the detector. Hence, during analysis the magnetic field is scanned over the different masses of interest. Parallel mass detection is possible when using the Mattauch-Herzog design, where all masses are focused in a focal plane containing several detectors.

Techniques for nanometrology and nanoanalysis are crucial for the ongoing development of nanotechnology products and processes in disciplines from materials to life sciences. The Helium Ion Microscope, HIM, has emerged as an ideal tool for imaging and nanopatterning. For secondary electron, SE-based imaging, resolutions of 0.5 and 2 nm are typical for helium ions and neon ions, respectively. While structures with sub 20 nm feature sizes may be rapidly patterned using neon, even smaller structures may be patterned using helium. The HIM is based on a gas field ion source, GFIS. The source consists of a cryogenically cooled, atomically sharp tip. When an electrical bias is applied to the tip, the local electric field can exceed the threshold for field ionization. In the presence of atoms of helium or neon gas, ionization occurs at the apex of the tip, producing one of the brightest ion beams known ($B>4\times10^9$ $A/cm^2$ sr). The ion beam is then accelerated to several tens of kilovolts and focused onto the sample by an electrostatic column. The interaction of the ion beam with the sample gives rise to several possible imaging modes. Secondary electrons, SE, secondary ions, SI, backscattered ions, BSI, and ionoluminescence have all been investigated.

The basic SE imaging mode using the HIM has several advantages compared with low voltage SEM. The shorter wavelength of ions compared to electrons eliminates the probe size limitations of diffraction. The lower convergence angle of the ion beam also gives rise to higher depth of field. The higher stopping power for ions compared with electrons gives rise to higher SE yields improving signal-to-noise ratios for low currents. The lower contribution of secondary electrons arising from BSI makes the technique more surface sensitive. Because the ion beam injects positive charge into the sample, charge compensation may be easily obtained over a wide range of primary beam energies using an electron flood gun. The ability to imaging charging samples without having to apply conductive coating has been widely used for imaging of biological specimens. The high-resolution milling capabilities of helium have been used to fabricate a wide range of nanoscale structures/ devices, including nanopores for biomolecule identification, graphene nanodevices, nanostructured silicon nitride membranes, and nanophotonic structures with smaller feature sizes and improved optical properties. The addition of neon has extended the milling/machining capabilities of the tool by providing increased milling rates and lower implantation and subsurface damage.

Despite these advantages, the HIM instrument currently lacks a of state-of-the-art analytical capability. This situation limits its fields of applications.

For the (nano-)characterisation of surfaces, several techniques are commonly used: X-ray photoelectron spectroscopy, XPS, Auger electron spectroscopy, AES, scanning electron microscopy, SEM, using energy dispersive X-ray spectroscopy, EDS, detector, transmission electron microscopy, TEM, using EDS or electron energy loss spectroscopy, EELS, or secondary ion mass spectrometry, SIMS. Each of these techniques has its advantages and weak points. The major drawback of the SIMS technique is that it does, as provided in the prior art, not provide directly quantitative data and rather complicated quantification procedures are required. Quantification of the sample composition is complicated by the dependence of the ionisation processes of the sputtered matter on the local sample composition. Therefore, the use of reference samples is typically required in any known solutions. In addition, quantification in SIMS at the beginning of the analysis gets complicated by changes in the ionisation processes of the sputtered matter. The implantation of primary ions changes the sample surface concentration for fluences typically up to $10^{17}$ ions/cm$^2$, which is defined as the transient or pre-equilibrium regime, and often leads to variations in secondary ion ionisation probabilities. In the same range of primary ion fluences, the preferential sputtering of one sample species contributes also often to changes in sample surface concentrations, and hence changing ionisation probabilities. Thus, the combination of the different mechanisms leads to secondary ion intensities where the counts do not reflect the true sample composition.

Technical Problem to be Solved

It is an objective of the invention to present a method, which overcomes at least some of the disadvantages of the prior art.

SUMMARY OF THE INVENTION

In accordance with a first aspect of the invention, a method for analysing secondary ion mass spectrum data is proposed. The mass spectrum data represents respective secondary ion counts for a range of masses at a given mass resolution, said mass spectrum data having been obtained by Secondary Ion Mass Spectrometry, SIMS, of at least one voxel of a sample, wherein the method comprises the steps of:
a) using data processing means, detecting peaks in said mass spectrum data and storing the corresponding mass for each detected peak in a first memory element;
b) using data processing means, associating each detected peak with ion species and/or cluster ions having a corresponding mass, the correspondences between masses and ion species/cluster ions being pre-recorded in a second memory element, and storing the result in a third memory element.

The association step for each peak is performed by order of increasing mass, and wherein said association step comprises, for a peak at a given mass that corresponds to a plurality of cluster ions, associating said peak with a selection of these cluster ions, wherein cluster ions comprising constituent ions that have been associated with peaks at lower masses are selected.

Preferably during at said selection step, only cluster ions comprising constituent ions that have been associated with peaks at lower masses may be selected for association with said peak corresponding to a plurality of cluster ion.

At said association step, cluster ions corresponding to given mass and comprising species with very low ionisation probability, such as noble gases, including but not limited to N, He, Ne, Ar, Kr, Xe, may be associated with a peak at that mass even if those species have not been associated with a peak at a lower mass.

Preferably, the method may further comprise the steps of:
determining peaks that have been associated with more than one ion and/or cluster ion;
for each determined peak, deconvoluting the corresponding mass spectrum data to identify the contribution of said ions and/or cluster ions in said peak,
and storing the result in said third memory element.

Said first, second and/or third memory element may preferably be logically addressable portions of the same physical memory element.

The data processing means may preferably comprise a data processing unit, which may preferably be programmed to carry out the described method steps. Alternatively, the data processing unit may comprise electronic circuitry for carrying out at the described method steps. The data processing unit may also comprise a combination of these alternatives.

The method may preferably comprise the steps of:
determining at least one portion of mass spectrum data, comprising at least a first peak at a first mass and second peak at a second mass, the difference between the second and first masses being less than the minimum mass difference that can be resolved at the resolution of the mass spectrum data;
deconvoluting the corresponding mass spectrum data to identify the contributions of the ions and/or cluster ions associated with said first and second peaks, in said mass spectrum data.

The deconvolution step may preferably comprise2 solving an optimization problem that fits a set of Gaussian functions to the shape of the detected peaks, wherein each Gaussian function is centered on a mass at which a peak has been detected, and each Gaussian function is representative of an ion species/cluster ion that has been associated with said peak.

The method may further preferably comprise the subsequent step of relative quantifying, using said data processing means, the concentration $c_i$ of each species i either detected as monatomic ion and/or cluster ion that has been associated with a detected peak in said mass spectrum data, $$c_i = \frac{\sum_{j=1}^{n} \frac{n_{i,j} s_{i,j}}{p_{i,j}}}{\sum_{k=1}^{m} \sum_{l=1}^{q_k} \frac{n_{k,l} s_{k,l}}{p_{k,l}}},$$

wherein $p_{i,j}$ is the ionisation probability of the monatomic or cluster ion j, $n_{i,j}$ is the number of atoms of species i in the secondary monatomic or cluster ion j, and $s_{i,j}$ is the intensity of the monatomic or cluster ion in j,
wherein the sum over j includes only monatomic or cluster ions which contain the chemical species i,
wherein the sum over k goes over all chemical elements present in the mass spectrum and the sum over l includes all monatomic or cluster ions which contain the element k,
wherein $q_k$ is the number of monatomic or cluster ions containing element k; and wherein
the ionisation probabilities $p_{i,j}$ are computed by the data processing means using, for negative monoatomic or cluster ions:

$$p_i = p_0 \cdot \exp\left(\frac{\chi_{i,SIMS} + EA_{i,SIMS} - \chi_{Cs}}{\epsilon_{\chi,A}}\right),$$

wherein $p_i$ is the ionisation probability of the monatomic or cluster ion i, $p_0$ is a constant equal to $9.5 \times 10^{-7}$,
wherein $\chi_{i,SIMS}$ is the electronegativity corrected for SIMS,
wherein $EA_{i,SIMS}$ is the electron affinity that has been obtained experimentally, and wherein $\chi_{cs}$ is the electron affinity of the ion species used as primary beam in the SIMS instrument used for obtaining the mass spectrum data,
the ionisation probabilities $p_{i,j}$ are computed by the data processing means using, for positive monoatomic or cluster ions:

$$p_i = p_0 \cdot \exp\left(\frac{\Psi_{i,SIMS} + I_{i,SIMS} - \Psi_0}{\epsilon_{\Psi,I}}\right),$$

wherein, $p_0$ is a constant equal to $9.5 \times 10^{-7}$ and $\epsilon_{\Psi,I}$ is a characteristic energy,
wherein $\Psi_{i,SIMS}$ is the electropositivity corrected for SIMS,
wherein $I_{i,SIMS}$ is the ionisation energy and wherein $\Psi_O$ is the electropositivity of the ion species used as a primary beam in the SIMS instrument used for obtaining the mass spectrum data.

Preferably, the method may further preferably comprise the subsequent step of absolute quantifying, using said data processing means, the concentration $c_i$ of each species i either detected as monatomic ion and/or cluster ion that has been associated with a detected peak in said mass spectrum data, $$c_i = \frac{\sum_{j=1}^{n} \frac{n_{i,j} s_{i,j}}{p_{i,j}}}{V},$$

wherein V is the volume of material sputtered during the detection of the monatomic or cluster ion i,
wherein $p_{i,j}$ is the ionisation probability of the monatomic or cluster ion j,
$n_{i,j}$ is the number of atoms of species i in the secondary monoatomic or cluster ion j, and
$s_{i,j}$ is the intensity of the monatomic or cluster ion in j,
wherein the sum over j includes only monatomic or cluster ions which contain the chemical species i,
wherein the sum over k goes over all chemical elements present in the mass spectrum and the sum over l includes all monatomic or cluster ions which contain the element k,
wherein $q_k$ is the number of monatomic or cluster ions containing element k, and wherein
the ionisation probabilities $p_{i,j}$ are computed by the data processing means using, for negative monoatomic or cluster ions:

$$p_i = p_0 \cdot \exp\left(\frac{\chi_{i,SIMS} + EA_{i,SIMS} - \chi_{Cs}}{\epsilon_{\chi,A}}\right),$$

wherein $p_i$ is the ionisation probability of the monatomic or cluster ion i, $p_0$ is a constant equal to $9.5 \times 10^{-7}$,
wherein $\chi_{i,SIMS}$ is the electronegativity corrected for SIMS,
wherein $EA_{i,SIMS}$ is the electron affinity that has been obtained experimentally, and wherein $\chi_{cs}$ is the electron affinity of the ion species used as primary beam in the SIMS instrument used for obtaining the mass spectrum data,
the ionisation probabilities $p_{i,j}$ are computed by the data processing means using, for positive monoatomic or cluster ions:

$$p_i = p_0 \cdot \exp\left(\frac{\Psi_{i,SIMS} + I_{i,SIMS} - \Psi_0}{\epsilon_{\Psi,i}}\right),$$

wherein, $p_0$ is a constant equal to $9.5 \times 10^{-7}$ and $\epsilon_{\Psi,I}$ is a characteristic energy,
wherein $\Psi_{i,SIMS}$ is the electropositivity corrected for SIMS,
wherein $I_{i,SIMS}$ is the ionisation energy and wherein $\Psi_O$ is the electropositivity of the ion species used as a primary beam in the SIMS instrument used for obtaining the mass spectrum data.

Preferably, prior to step a), a smoothing filter may be applied to said spectrum data, and steps a)-b) may be applied on said resulting smoothed spectrum data.

Said smoothing filter may preferably preserves peaks in the original spectrum data while ensuring that the first and second derivative of the smoothed spectrum data exist.

The smoothing filter may preferably be a Savitzky-Golay filter.

Preferably, the identification of a peak in said smoothed spectrum data may comprise the identification of masses for which the second derivative of said smoothed spectrum data presents a local minimum.

The mass spectrum data may preferably be aggregated data obtained for a plurality voxels of said sample.

Preferably, said mass spectrum data may have been obtained using a SIMS instrument comprising a magnetic sector analyser.

The mass spectrum data may preferably have been obtained using a detector assembly capable of detecting ions within a range of charge/mass ratios.

According to another aspect of the invention, a secondary ion mass spectrum data analysing device is proposed, wherein the mass spectrum data has been obtained by Secondary Ion Mass Spectrometry, SIMS, of at least one voxel of a sample and represents respective secondary ion counts for a range of masses at a given mass resolution. The analysing device comprises data processing means and at least one memory element, the data processing means being configured for:

detecting peaks in said mass spectrum data, which is pre-provided in said memory element, and storing the corresponding mass for each detected peak in a memory element;

associating each detected peak with ion species and/or cluster ions having a corresponding mass, the correspondences between masses and ion species/cluster ions being pre-recorded in a memory element, and storing the result in a memory element;

wherein the association step for each peak is performed by order of increasing mass, and wherein at said association step, a peak at a given mass that corresponds to a plurality of cluster ions is associated with a selection of these cluster ions, the selection depending on the previous association of peaks at lower masses with at least part of the constituent ions of these cluster ions.

The data processing means may further preferably be configured to carry out any of the method steps in accordance with previous aspects of the invention.

In accordance with yet another aspect of the invention, a computer program comprising computer readable code means is proposed, which when run on a computer, causes the computer to carry out the method according to aspects of the invention.

According to a final aspect of the invention, a computer program product is proposed, comprising a computer-readable medium on which the computer program according the previous aspect of the invention is stored.

The method in accordance with aspects of the invention allows for automatic peak detection in data describing a mass spectrum obtained by SIMS of a sample. Further, for fully resolved peaks, the corresponding ion species or cluster ions are assigned to the peaks. In accordance with further preferred embodiments of the invention, the spectrum data for portions which are not fully resolved, i.e. which comprise peaks that are closer to each other than the minimum mass difference that can be resolved at the resolution of the provided mass spectrum data, is deconvoluted in order to identify the contributing ion species and/or cluster ions. By taking into account ion species that have been resolved at lower masses, the so-detected deconvoluted peaks may be assigned to cluster ions that imply said already detected ion species. The method further proposed quantification of the detected ion species and/or cluster ions in the analysed sample, without relying on a previous characterization of a corresponding reference sample. The aspects proposed by the invention allow for the straightforward analysis of SIMS spectrum data, which may be obtained using a single detector covering a large mass range, or which may have been obtained using multiple detectors covering smaller mass ranges each.

SIMS instruments with time-of-flight mass spectrometers allow for the recording of the full mass spectrum in a single step, but have the drawback of relatively low sensitivity and low duty cycle. SIMS instruments equipped with magnetic sector instruments have the advantage of high sensitivity and high duty cycle, but had up to now the disadvantage that the detection was limited to 1 up to 7 mass in parallel depending on the instrument. With the development of a focal plane detector for the mass spectrometer on the HIM, parallel detection of the full mass spectrum in combination with high duty cycle becomes possible. Due to the high duty cycle related to the continuous primary ion beam, a large amount of data is recorded in a short time. The aspects in accordance with the invention are particularly useful for the automatic analysis of SIMS mass spectrum data that has been obtained using SIMS on the HIM, potentially in conjunction with a single focal plane detector.

BRIEF DESCRIPTION OF THE DRAWINGS

Several embodiments of the present invention are illustrated by way of figures, which do not limit the scope of the invention, wherein.

DETAILED DESCRIPTION OF THE INVENTION

Figure 1:
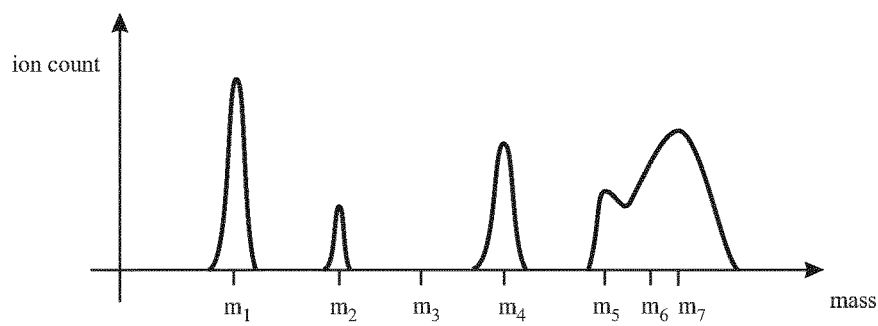
FIG. 1 illustrates artificial SIMS mass spectrum data as analysed by the method in accordance with embodiments of the invention.

This section describes features of the invention in further detail based on preferred embodiments and on the figures, without limiting the invention to the described embodiments. Unless otherwise stated, features described in the context of a specific embodiment may be combined with additional features of other described embodiments. Throughout the description, similar reference numerals will be used for similar or the same concept across different embodiments of the invention.

For the sake of explaining the method in accordance with a preferred embodiment of the present invention, FIG. 1 provides an illustration of artificial secondary ion mass spectrum data. The data provides ion counts for a range of masses at a given mass resolution. Such data may be obtained by any kind of SIMS instrument, from a voxel of a sample. If the sample comprises a plurality of areas of which it is a priori known that they have a similar composition, the resulting respective ion counts for each voxel may be cumulated in aggregated mass spectrum data such as the data shown in FIG. 1. While any SIMS instrument could be used to obtained the mass spectrum data, preferably, the data may have been obtained using a magnetic sector instrument, using a single focal plane detector capable of detecting ion counts over a large range of masses. Detectors are as such known in the art and their functioning will not be explained in the context of the present invention. Any instrument that is used provides limited mass resolution, which is reflected in the acquired data: the instrument defines the minimum mass difference that can be resolved. The method aims at attributing ion species and/or cluster ions to the peaks that are present in the mass spectrum data.

In a first step, the peaks are therefore detected using data processing means. While the data itself is pre-provided in a memory element, the data processing means preferably comprise a data processor having at least read access the memory element, and which is configured, for example through appropriately coded software, to detect signal peaks in said mass spectrum data. Any known methods for detecting peaks may be used, and a specific example of how this may be achieved will be provided later on. In the example of FIG. 1, peaks will be detected for the masses labelled as $m_1$, $m_2$, $m_4$, $m_5$ and $m_7$. It should be noted that a higher mass index label indicates a higher mass.

The data processing means have access to a further memory element, for example a databased, in which correspondences between masses and ion species/cluster ions are pre-provided. Table I provides an example of the content of a such a memory element, using artificial data that will be used for the example of FIG. 1. Each mass label corresponds to an ion species or cluster ion labelled as $s_i$ or $s_is_j$ respectively. It should be noted that both ion species and cluster ions may correspond to a given mass.

TABLE I ion species and cluster
ions corresponding to masses

| Mass label | ion species/cluster ion label |
|---|---|
| $m_1$ | $s_1$ |
| $m_2$ | $s_2$ |
| $m_3$ | $s_3$ |
| $m_4$ | $s_1s_{10}$, $s_1s_{11}$, $s_3s_{12}$ |
| $m_5$ | $s_2s_{10}$, $s_4s_{11}$ |
| $m_6$ | $s_6$ |
| $m_7$ | $s_7$ |

The data processing means proceed with associating the detected peaks with corresponding ion species and/or cluster ions having a corresponding mass. This is achieved by proceeding by order of increasing mass. For example, the peaks at masses $m_1$ and $m_2$ are associated with ion species $s_1$ and $s_2$ respectively. The peak at mass $m_4$ may correspond to any of the cluster ions $s_1s_{10}$, $s_1s_{11}$ or $s_3s_{12}$. However, as the species $s_3$ has not been detected at mass $m_3$, it is not selected as a candidate for attribution to mass $m_4$. The context provided by the analysis of the spectral data at lower masses allows the data processing means to automatically select only realistic candidates during this analysis step. The same reasoning is applied to the peak at mass $m_5$; thereby the candidate cluster ion $s_4s_{11}$ is not associated with the corresponding peak.

In a preferred embodiment, an exception to the above approach may be made for ion species with very low ionisation probabilities, which are easier to detect as cluster ions than as a distinct ion species. In that case, a cluster ion comprising said species (e.g. a noble gas) will be associated with a detected peak at a corresponding mass, even though the corresponding species was not detected in isolation at a lower mass.

Table II provides a resulting association between detected peaks in the data illustrated by FIG. 1, and ion species/cluster ions. This result is stored in a structured memory element to which the data processing means have at least write access. The result is useful for understanding the composition of the analysed sample and is provided automatically by the data processing means.

TABLE II detected peaks and
associated ion species/cluster ions

| peak | associated ion species/cluster ion label |
|---|---|
| $m_1$ | $s_1$ |
| $m_2$ | $s_2$ |

TABLE II-continued detected peaks and
associated ion species/cluster ions

| peak | associated ion species/cluster ion label |
|---|---|
| $m_4$ | $s_1s_{10}$, $s_1s_{11}$ |
| $m_5$ | $s_2s_{10}$ |
| $m_7$ | $s_7$ |

In accordance with another embodiment of the invention, the resulting data, as shown by the example of Table II, is processed further, to resolve any further arising conflicts. As illustrated by the example of the peak at mass $m_4$, several cluster ions may remain associated with a single peak. They may all be present in the sample at different concentrations, or the peak may be attributed exclusively to one or the other of the associated cluster ions.

Another conflict arises if peaks are detected at masses, the difference between which is lower than the mass resolution at which the original mass spectrum data has been obtained. In an other example, the spectrum data may span masses, for which no peak was detected, but which are closer to a detected peak than the minimum difference that is resolved in the data. In FIG. 1, this situation arises between masses with labels $m_6$ and $m_7$.

These conflicts are resolved by the data processing means by proceeding to deconvolution of the corresponding portions of the mass spectrum data. Several deconvolution algorithms are known from the prior art and examples will be provided later on. Deconvolution provides the constituent signals that add up to the overall mass spectrum data. The corresponding portions are detected by the data processing means based on the association table (e.g. Table II) and on the known resolution at which the mass spectrum data was acquired. This allows the data processing means for example to detect that the data portion comprising masses $m_5$ to $m_7$ may mask a hidden peak at mass $m_6$. The portion of interest may for example be identified by considering only the mass spectrum data spanning from a starting mass to an ending mass. The starting mass may be identified as the mass providing an ion count being larger than a predetermined threshold value (e.g. 0) left of mass $m_5$, while the ending mass may be identified as the mass providing an ion count being lower or equal to a predetermined threshold value (e.g. 0) right of mass $m_7$. The deconvolution step enables the processing means to identify further peaks, and, together with the already detected peaks at lower masses to which ion species/cluster ions have already been associated, these peaks will be associated to ion species/cluster ions following the same exclusion approach as explained in the context of Table II.

According to a further embodiment of the invention, once all peaks are associated with an ion species or cluster ion, quantification of the detected species/cluster ions is performed by the data processing means.

Quantification

Difficulties for quantification in SIMS originate mainly from two processes: preferential sputtering from the sample and changes in ionisation probabilities of the secondary ions. The latter can be induced by variations in sample composition or changes in surface composition induced by the preferential sputtering. Preferential sputtering depends on the difference in mass of the different sample species and the mass of the primary ion. In "Surface modifications due to preferential sputtering; 1982; Vol. 13, pp 80-93", Taglauer studied the change in surface composition for several oxygen and carbon containing samples. The preferential sputtering is more pronounced for the lighter He$^+$ than for Ar$^+$ and for targets where the chemical elements have a large difference in atomic mass. A similar trend is observed or the irradiation of several alloys with Ar$^+$ and Xe$^+$ ions, see Holloway et al., "Journal of Vacuum Science & Technology. 1982, pp 444-448". The effect is also more pronounced at lower than at higher impact energies. For the latter, surface segregation is expected to play an important role too. These are however not the only parameters. The surface binding energy becomes more important when the sample species have similar mass and at higher impact energies and leads to a qualitative agreement with Sigmund's theory of sputtering, see Malherbe et al. "Preferential sputtering of oxides: A comparison of model predictions with experimental data; North-Holland, 1986; Vol. 27, pp 355-365." In this situation, the surface composition in steady-state conditions is given by:

$$\frac{C_A^s}{C_B^s} = \frac{N_A^b}{N_B^b}\left(\frac{M_A}{M_B}\right)^{2m}\left(\frac{U_A}{U_B}\right)^{1-2m} \quad (1)$$

where $C_i^s$ is the surface concentration, $N_i^b$ the bulk density, $M_i$ the atomic mass and $U_i$ the surface binding energy of species i. Furthermore, mixing can lead to sample atoms penetrating deeper into the sample, modifying the sample surface composition additionally. This is mostly observed for lighter elements. In general, information about the surface composition is available for steady state conditions, but a model describing the evolution of the preferential sputtering towards steady state conditions is missing.

The sputtering of matter is only one aspect of importance for the formation of mass spectra. Another important point is the ionisation of the sputter matter, both of which are interrelated. For the matter sputtered from metal or semiconductor samples, the electron tunnelling model is generally used, as published by Wittmaack in Surf. Sci. Rep. 2013. For positive ions, the ionisation probability is commonly given by:

$$\begin{cases} \beta^+ = 1, \text{ if } \phi > I \\ \beta^+ = e^{-\left(\frac{I-\phi}{\epsilon_p}\right)}, \text{ if } \phi < I \end{cases} \quad (2)$$

Where I is the ionisation energy of the sputtered atom, $\phi$ is the electron work function of the sample and $\epsilon_p$ is a parameter depending on the velocity with which the atom leaves the surface. For negative ions, the process is described by a similar equation where the ionisation energy of the sputtered atom is replaced by the electron affinity A of the sputtered atom:

$$\begin{cases} \beta^- = 1, \text{ if } \phi < A \\ \beta^- \propto e^{-\left(\frac{\phi-A}{\epsilon_n}\right)}, \text{ if } \phi > A \end{cases} \quad (3)$$

According to the model, ionisation probabilities should depend on the velocity of the sputtered atoms. A recent work showed that this dependence cannot be observed in the energy dependence of sputtered ions recorded for different electron work function. Therefore, it was suggested that ionisation should depend on the local properties of the sample, and the work function needs to be replaced by the electronegativity. Data could be fitted best when considering the electronegativity as defined by Mulliken see Wittmaack, "Novel Model of Negative Secondary Ion Formation and Its Use To Refine the Electronegativity of Almost Fifty Elements; American Chemical Society, 2014; Vol. 86, pp 5962-5968.".

For the ionisation of matter sputtered from oxides, the model developed by Slodzian in Surface Science pp 161-186 and Physica Scripta 1983, is commonly used. During the sputtering process, an ion M$^+$ leaves the sample and leaves behind a vacant cation with an electron affinity A. This site is supposed to retain the electron for the duration of the sputtering process (~10$^{-3}$s). A charge transfer between sample and sputtered ion is possible at a distance R$_C$ above the surface where the curves for ionic potential energy and covalent potential energy are crossing each other. The probability of charge transfer is defined by the Landau-Zener formula which predicts that the ionisation probability should decrease quickly with increasing ionisation energy.

Due to the dependence on the local sample composition, known quantification methods in SIMS rely on the use of reference samples with known composition. Mostly, the relative sensitivity factor, RSF, for a given chemical element in a given matrix is used for quantification. The concentration of an element of interest $c_i$ is given by:

$$c_i = \frac{I_i}{I_m} RSF \quad (4)$$

Where $I_i$ is the secondary ion intensity of i and $I_m$ the intensity of matrix element m. The RSF factor can be determined by measuring samples of know concentration and concentrations of element i similar to the one of the sample of interest. For given sample, this method is successful when the concentration of i is not changing a lot and hence the RSF factor is constant. Examples of applications is the quantification of nitrogen in aluminium (Hofmeister et al. Materials Science and Engineering: A. pp 412-417) or semiconductor samples (Zalm, P. C. Reports on Progress in Physics. 1995, pp 1321-1374). Even if this method provides high accuracy, the necessity of having reference samples of a similar composition than the sample to be analysed makes it painful, especially if samples of unknown composition need to be analysed. In addition, the use of references samples which need to be analysed the same day makes the method time consuming.

An alternative standard-free method was developed by Balamurugan et at in Int. J. Mass Spectrom. 2015, 386, 56-60. This method relies on the use of MCs$_x^+$ clusters, and hence only on a small amount of the total secondary ion current. The concentration $c_i$ of species i is calculated by considering all Cs clusters except those containing atoms originating from the instrument (e.g. O, C):

$$c_i = \frac{\sum_{j=1}^{m} n_{ji} s_j}{\sum_{k=1}^{n} \sum_{l=1}^{e_k} n_{lk} s_k} \quad (5)$$

Where m is the number of clusters containing the i$^{th}$ element, $n_{ij}$ the number of atoms of the i$^{th}$ species in the j$^{th}$ cluster, $s_j$ the intensity of that cluster, n the total number of clusters, $e_k$ the total number of elements considered for the k$^{th}$ cluster and $s_k$ the intensity of that cluster. Overall, this method does not consider differences in ionisation probabilities between the different clusters, and concentrations obtained by this method are off by almost a factor 2. Another drawback of this method is the initial guess of the chemical species which are present in the sample, and removing and/or adding species until the process converges properly. This approach does not ensure that a mathematically stable solution corresponds also the real sample composition.

Another approach has been developed for semiconductor samples where the characterisation of present devices requires lateral resolution below 10-20 nm and which are beyond the capabilities of current commercial SIMS instruments (Franquet et al. Applied Surface Science. pp 143-152). The objective was to obtain high lateral resolution, yet retain the high sensitivity of the technique. The new method has been named Self Focusing SIMS and is based on the concept of detecting cluster ions containing the species of a given area. As the atoms of the cluster are sputtered during a same collision cascade, they are emitted from a small area of the sample (<0.5 nm) and the information becomes confined, leading to the terminology of "self-focusing". Compared to the other techniques used in the paper (AES, TEM/EDS and Atom Probe Tomography, APT), the sensitivity and statistics of the new method are better when averaging over several features. The smallest features investigated were 20 nm.

Still related to quantification is the development of methods which allow to correct depth profiles in SIMS for changes in ion intensities and peak shifts related to sputter-induced artefacts. To reconstruct the original in depth distribution, Dowsett et al. have developed the depth response function in Analytica Chimica Acta. 1994, pp 253-275 and Hofmann et al. the mixing-roughness-information depth, MRI, model (Progress in Surface Science. 1991, pp 35-87). Though very useful, they cannot deal with concentrations, preferential sputtering and atomic mixing changing during depth profiling. Therefore, numerical solutions to the analytical depth response function and MRI model have been developed and the latter has been applied successfully to the reconstruction of a Ta/Si multilayer depth profile, see Liu et al. "Quantitative reconstruction of Ta/Si multilayer depth profiles obtained by Time-of-Flight-Secondary-Ion-Mass-Spectrometry (ToF-SIMS) using Cs+ ion sputtering; 2015; Vol. 591, Part, pp 60-65.". Variations of the sputter rate with sputter depth, variations of sensitivity with composition, variation of roughness with depth and variations of the elemental sputter rate with composition were taken into account. Although correcting for many artefacts, these known methods rely on reference samples to fit the different parameters of the model and are only of interest when analysing under identical conditions a large number of similar samples.

Irradiation induced changes in materials and sputtering of matter is one important aspect for SIMS. Recent studies of our group have shown that $He^+$, $Ne^+$ and $Ar^+$ irradiation of polymers changes their surface structure but sample swelling and roughness formation, which is observed for similar experimental conditions on inorganic samples, have not been observed. Further investigations showed that diffusion coefficients of the rare gas elements in polymers were high enough to prevent any accumulation of these species in the sample and to avoid any swelling and bubble formation.

In addition to controlling preferential sputtering mechanisms, controlling the ionisation processes is a second important aspect. Since the early days of SIMS, it was noticed that the implantation of reactive primary ion species increased the secondary ion yields (e.g. oxygen for positive secondary ions and caesium for negative ones). Instead of implantation, oxygen can also be adsorbed on the sample surface by flooding the sample pressure with the gas (Franzreb et al. Surface Science. pp 291-309). For caesium, the evaporation of the metal under vacuum and its adsorption on the sample surface during SIMS analysis was successful. The latter method was further developed by Wirtz et al. (Applied Surface Science; 2004; Vol. 557, pp 57-72) for the analysis using $MCs_x^+$ secondary ion clusters and by Philipp et al. for the detection of negative secondary $M^-$ ions (Int. J. Mass Spectrom. 2006, 253 (1-2), 71-78). The flooding and evaporation experiments have been carried out with primary ion species typically used in SIMS (e.g. $Ar^+$, $Ga^+$, $Cs^+$). More recently this work was extended by the same authors to the irradiation with light rare gas primary ions, showing that the sensitivity after optimising the analysis conditions does not depend on the choice of the primary ion species. This is of importance for the development of mass spectrometers as an add-on tool for helium ion microscopy and DualBeam instruments to achieve high-resolution, high-sensitivity ion microscopy.

In accordance with a preferred embodiment of the invention, the SIMS spectrum data that is analysed by the data processing means is obtained using SIMS of a sample on a Helium Ion Microscope. As both the helium and neon beams sputter material locally from the sample, the sputtered material can be used as the basis of an analytical signal. As some fraction of the sputtered material will be ionized, it can be analysed using secondary ion mass spectrometry. As the probe size in the HIM is substantially smaller (both for helium and neon) than SI emission area, the lateral resolution is in principal limited only by fundamental considerations and not by the probe size. The prospect of adding SIMS to the HIM yields not just a powerful analytical capability, but opens the way for in situ correlative imaging combining ultrahigh resolution SE images with elemental maps from SIMS. We have previously shown that combining SIMS with other high-resolution microscopies in situ can be used to gain insights not possible with standalone techniques and correct for certain artefacts. While secondary electron imaging on the HIM yields topographical information on the nanometer and even sub nanometer scale, SE imaging alone is often not enough to obtain a deep understanding of the sample.

SIMS imaging provides elemental/mass filtered imaging on the tens of nm scale; however, as the signal level of SIMS images is typically 10-100× lower than that of corresponding SE images, the lower signal-to-noise ratio and poorer lateral resolution can make interpretation of SIMS images more difficult. SIMS images often produce hot spots of a few pixels in size that are statistically significant due to the low background of SIMS (<<1 cps) but yield little information about the size and morphology of the underlying structures that give rise to the signal. By combining both types of information, features too small to be adequately resolved in SIMS may be investigated by SE imaging. Although it is possible to carry out the measurements on separate instruments, the ability to carry out both types of characterization in situ allows for better coregistration of the acquired data, by minimizing positional uncertainty and image artefacts that arise when trying to combine and overlay data acquired on multiple instruments. Further, by combining these two techniques in situ artefacts due to contamination or sample modification during transfer between instruments may be avoided. Our instrument allows switching between the two imaging modes in as little as a few seconds.

In accordance with aspects of the invention, either a relative or absolute reference-free quantification of the ion species/cluster ions that have been associated with the corresponding peaks in the analysed mass spectrum data may be performed by the data processing means using the following additional method steps.

For relative quantifying, the concentration $c_i$ of each species i either detected as monatomic ion and/or cluster ion that has been associated with a detected peak in said mass spectrum data is computed as:

$$c_i = \frac{\sum_{j=1}^{m} \frac{n_{i,j} s_{i,j}}{p_{i,j}}}{\sum_{k=1}^{m} \sum_{l=1}^{q_k} \frac{n_{k,l} s_{k,l}}{p_{k,l}}}, \quad (6)$$

wherein $p_{i,j}$ is the ionisation probability of the monatomic or cluster ion j, $n_{i,j}$ is the number of atoms of species i in the secondary monatomic or cluster ion j, and $s_{i,j}$ is the intensity of the monatomic or cluster ion in j, wherein the sum over j includes only monatomic or cluster ions which contain the chemical species i, wherein the sum over k goes over all chemical elements present in the mass spectrum and the sum over l includes all monatomic or cluster ions which contain the element k, wherein $q_k$ is the number of monatomic or cluster ions containing element k;

and wherein
the ionisation probabilities $p_{i,j}$ are computed by the data processing means using, for negative monoatomic or cluster ions:

$$p_i^- = p_0 \cdot \exp\left(\frac{\chi_{i,SIMS} + EA_{i,SIMS} - \chi_{Cs}}{\epsilon_{\chi,A}}\right), \quad (7)$$

wherein $p_i^-$ is the ionisation probability of the monatomic or cluster ion i, $p_0$ is a constant equal to $9.5 \times 10^{-7}$, wherein $\chi_{i,SIMS}$ is the electronegativity corrected for SIMS, wherein $EA_{i,SIMS}$ is the electron affinity that has been obtained experimentally, and wherein $\chi_{cs}$ is the electron affinity of the ion species used as primary beam in the SIMS instrument used for obtaining the mass spectrum data, the ionisation probabilities $p_{i,j}$ are computed by the data processing means using, for positive monoatomic or cluster ions:

$$p_i^+ = p_0 \cdot \exp\left(\frac{\Psi_{i,SIMS} + I_{i,SIMS} - \Psi_0}{\epsilon_{\Psi,I}}\right), \quad (8)$$

wherein, $p_0$ is a constant equal to $9.5 \times 10^{-7}$ and $\epsilon_{\Psi,I}$ is a characteristic energy, wherein $\Psi_{i,SIMS}$ is the electropositivity corrected for SIMS, wherein $I_{i,SIMS}$ is the ionisation energy and wherein $\Psi_O$ is the electropositivity of the ion species used as a primary beam in the SIMS instrument used for obtaining the mass spectrum data.

For absolute quantifying, the concentration $c_i$ of each species i either detected as monatomic ion and/or cluster ion that has been associated with a detected peak in said mass spectrum data is given by:

$$c_i = \frac{\sum_{j=1}^{m} \frac{n_{i,j} s_{i,j}}{p_{i,j}}}{V}, \quad (9)$$

wherein V is the volume of material sputtered during the detection of the monatomic or cluster ion i, wherein $p_{i,j}$ is the ionisation probability of the monatomic or cluster ion j, $n_{i,j}$ is the number of atoms of species i in the secondary monatomic or cluster ion j, and $s_{i,j}$ is the intensity of the monatomic or cluster ion in j, wherein the sum over j includes only monatomic or cluster ions which contain the chemical species i, wherein the sum over k goes over all chemical elements present in the mass spectrum and the sum over l includes all monatomic or cluster ions which contain the element k, wherein $q_k$ is the number of monatomic or cluster ions containing element k;

and wherein
the ionisation probabilities $p_{i,j}$ are computed by the data processing means using, for negative monoatomic or cluster ions:

$$p_i^- = p_0 \cdot \exp\left(\frac{\chi_{i,SIMS} + EA_{i,SIMS} - \chi_{Cs}}{\epsilon_{\chi,A}}\right), \quad (10)$$

wherein $p_i^-$ is the ionisation probability of the monatomic ion i, $p_0$ is a constant equal to $9.5 \times 10^{-7}$, wherein $\chi_{i,SIMS}$ is the electronegativity corrected for SIMS, wherein $EA_{i,SIMS}$ is the electron affinity that has been obtained experimentally, and wherein $\chi_{cs}$ is the electron affinity of the ion species used as primary beam in the SIMS instrument used for obtaining the mass spectrum data, the ionisation probabilities $p_{i,j}$ are computed by the data processing means using, for positive monoatomic or cluster ions:

$$p_i^+ = p_0 \cdot \exp\left(\frac{\Psi_{i,SIMS} + I_{i,SIMS} - \Psi_O}{\epsilon_{\Psi,I}}\right), \quad (11)$$

wherein, $p_0$ is a constant equal to $9.5 \times 10^{-7}$ and $\epsilon_{\Psi,I}$ is a characteristic energy, wherein $\Psi_{i,SIMS}$ is the electropositivity corrected for SIMS, wherein $I_{i,SIMS}$ is the ionisation energy and wherein $\Psi_O$ is the electropositivity of the ion species used as a primary beam in the SIMS instrument used for obtaining the mass spectrum data.

The proposed method in accordance with the current embodiment of the invention includes the values $\chi_{i,SIMS}$ for most chemical elements of the periodic table $EA_{i,SIMS}$. Indeed values in literature for $EA_i$ have been determined using different methods and are not always consistent. For the current quantification method, a consistent set of data has been determined by fitting $EA_{i,SIMS}$ to experimental ionisation probabilities. In addition, the method has been extended to include secondary cluster ions. The model by Wittmaack has been developed for negative secondary ions. For positive secondary ions, the model has been adapted by replacing the electronegativity corrected by SIMS by an electropositivity corrected for SIMS and the electron affinity by the first ionisation energy. All values required for the quantification are stored in a look-up table.

In addition to the provided examples, a further preferred embodiment of the invention is disclosed herein. To guarantee maximum sensitivity at highest possible lateral resolution, the mass spectrometer with a Mattauch-Herzog design is considered for the acquisition of the mass spectrum data that is analysed using aspects of the invention. A focal plane detector is used, allowing the detection of all masses in parallel.

$He^+$ and $Ne^+$ irradiation at normal incidence have be carried out on the ZEISS NanoFab™ instrument. In addition to the Gas Field Ion Source, GFIS, source this instrument is equipped with a compact double focussing magnetic sector mass spectrometer allowing for the detection of all masses in parallel using a focal plane detector and a detector for total ion counts, TIC, measuring the total secondary ion current. The mass spectrometer integrates an evaporation system for cesium flooding and a leak valve for oxygen flooding. The $He^+$ and $Ne^+$ impact energy can be changed in the range of 10 to 35 keV.

A specific focus lies on high resolution imaging applications where the amount of matter per voxel is limited and the sensitivity degrades for non-optimised ionisation processes, and where the pre-equilibrium regime is of utmost importance because images get recorded mostly with fluences smaller than $10^{18}$ ions/cm$^2$.

Figure 2:
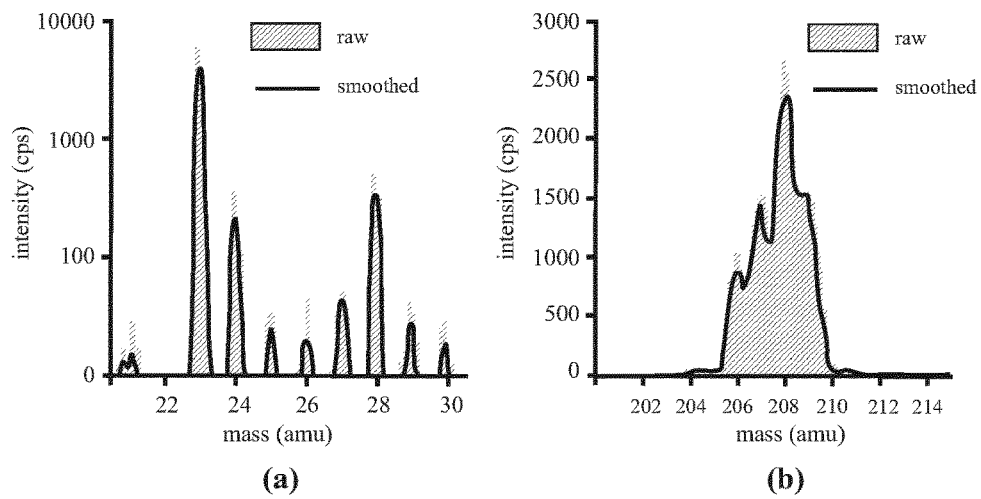
FIG. 2 illustrates part of the mass spectrum before and after smoothing using the Savitzky Golay algorithm (a) for the mass range of 21 to 30 amu, and (b) from 200 to 215 amu.

As a preliminary step in accordance with the present embodiment, the smoothing of the raw data recorded on the focal plane detector is performed. This is being done using a smoothing algorithm preserving the fine shape of the peaks in the mass spectra. For the processing of the mass spectra the Savitzky-Golay algorithm with a window of 4 points to the left and to the right. The number of points for the window will change with mass resolution, i.e. the number of points per mass unit. Other algorithms fulfilling the same criteria than the Savitzky-Golay algorithm, i.e. smoothing the data without significantly broadening the peak width, can be used. FIG. 2 illustrates part of the mass spectrum before and after smoothing using the Savitzky-Golay algorithm (a) for the mass range of 21 to 30 amu, and (b) from 200 to 215 amu.

Figure 3:
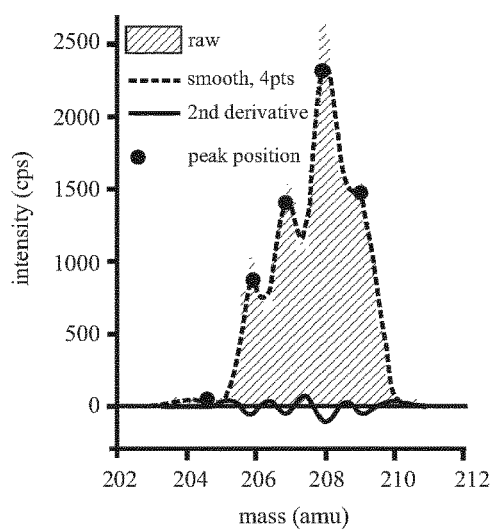
FIG. 3 illustrates raw mass spectrum with smoothed curve, its second derivative and the positions of the peaks deduced from the second derivative for the mass range of 202 to 212 amu, in accordance with embodiments of the invention.

Then, as described earlier the step of automatic identification of peaks in the mass spectrum is performed. The first and second derivative of the smoothed mass spectrum is taken for one or several mass ranges of interest using the Savitzky-Golay algorithm. Instead of using smoothed data as input, it is also possible to smooth the derivatives using the procedure described the previous step. The peak positions correspond to the minima of the second derivative. The minima are identified using the Brent algorithm after initial bracketing of a minimum. The process can also be carried out on the full mass spectrum. This step will accelerate and facilitate data interpretation. The window size for the Savitzky-Golay algorithm is identical to point 1, i.e. 4 points to the left and 4 points to the right, and will change with the number of points per mass unit. FIG. 3 illustrates the raw mass spectrum with smoothed curve, its second derivative and the positions of the peaks deduced from the second derivative for the mass range of 202 to 212 amu.

In a next step, specific isotopes will be assigned to the different peak positions by comparing the peak position to the exact mass of the all stable isotopes, as described in the context of previously disclosed embodiments of the invention. The latter are saved in a look-up table. The process will start with the peak with lowest mass, i.e. a peak where any mass interference by cluster ions can be excluded. All higher mass peaks will be identified after, starting with the lowest mass peaks. By proceeding in that order, possible mass interferences can be identified, i.e. if a chemical element has been identified at lower mass, it can also be present at higher mass, and cluster ions without possible mass interference can be identified with certainty. All peaks will be saved in a list. This process works for peaks which are well separated. This process is possible since the continuous irradiation with the ion beam leads to an important fragmentation of the sample material, allowing only cluster ions with a small number of atoms to form. This point differs from SIMS based on ToF mass spectrometers, where molecular information should be preserved to a maximum and a large number of possible mass interferences in the higher mass range does not allow for an unambiguous identification of all mass interferences.

Figure 4:
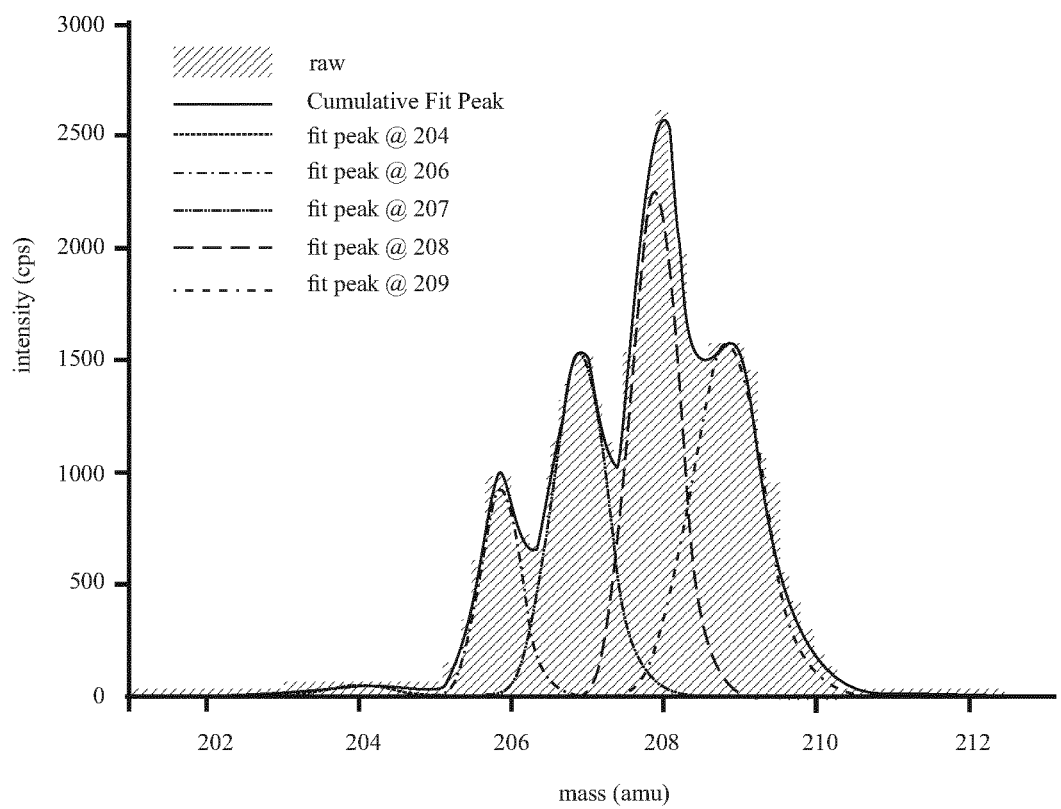
FIG. 4 illustrates a deconvoluted mass spectrum for the mass range of 202 to 212 amu using the Levenberg-Marquardt algorithm, in accordance with embodiments of the invention.

For data processing, peak areas need to be known. For well separated peaks, the information is easily obtained. For peaks with mass interferences and not completely separated peaks, the area from the different atomic and cluster ions contributing to a peak or a group of peak will be determined by a deconvolution process. We are using the Levenberg-Marquardt algorithm with a Gaussian function as shape of the peaks, but other algorithms can be used too. Details of this fitting algorithm may be found in "An Algorithm for Least-Squares Estimation of Nonlinear Parameters" by: Donald W. Marquardt, Journal of the Society for Industrial and Applied Mathematics, Vol. 11, No. 2 (June, 1963), pp. 431-441 and "Numerical Recipes", Cambridge University Press; 3 edition (Sep. 10, 2007), which are hereby incorporated by reference in their entirety. For the initial guess of parameters, the peak centres are defined based on the mass of the isotopes, the secondary ion counts at the peak position are used for amplitude and the width w is derived from the number of mass interferences n which have been identified and the distance d to the next peak when it is equal to less than a mass unit: w=d/n. For the deconvolution process, the positions of the peaks one relative to the other are fixed and equal to the difference in atomic mass. An overall shift of the peak position is allowed to correct for any drift in mass calibration. The outcome of the convolution process is checked against any inconsistencies in isotopic ratios and is used the results of the deconvolution process until proper convergence is achieved. FIG. 4 illustrates a deconvoluted mass spectrum for the mass range of 202 to 212 amu using the Levenberg-Marquardt algorithm.

The resulting analysed data may then be used to perform the earlier described relative or absolute quantification steps.

The methods outlined here above are preferably implemented using processing means such as a data processor, which is appropriately programmed, or by specific electronic circuitry, as it is known in the art. The skilled person is capable of providing such programming code means or circuitry providing the required functionality based on the description that has been given, based on the drawings and without undue further burden.

It should be understood that the detailed description of specific preferred embodiments is given by way of illustration only, since various changes and modifications within the scope of the invention will be apparent to the skilled person. The scope of protection is defined by the following set of claims.

The invention claimed is:

1. A computer-implemented method for analyzing secondary ion mass spectrum data representing respective secondary ion counts for a range of masses at a given mass resolution, said mass spectrum data having been obtained by Secondary Ion Mass Spectrometry, SIMS, of at least one voxel of a sample, wherein the computer-implemented method comprises the steps of:

detecting peaks using a data processing means in said mass spectrum data and storing a corresponding mass for each detected peak in a first memory element; and associating each of the detected peaks using data processing means with ion species and/or cluster ions that have a corresponding mass, wherein the correspondences between masses and ion species/cluster ions are pre-recorded in a second memory element and a result is stored on a third memory element;

wherein associating each of the detected peaks is performed by order of increasing mass, wherein associating each of the detected peaks includes associating each peak at a given mass that corresponds to a plurality of cluster ions, with a selection of these cluster ions, wherein cluster ions comprising constituent ions that have been associated with peaks at lower masses are selected.

2. The computer-implemented method of claim 1, further including:

determining peaks that have been associated with more than one ion and/or cluster ion; and for each determined peak, deconvoluting the corresponding mass spectrum data to identify the contribution of said ions and/or cluster ions in said peak, and storing the result in said third memory element.

3. The computer-implemented method claim 1, further including:

determining at least one portion of mass spectrum data, comprising at least a first peak at a first mass and a second peak at a second mass, the difference between the second mass and the first mass being less than a minimum mass difference that is resolvable at the given mass resolution of the mass spectrum data;

deconvoluting the corresponding mass spectrum data to identify the contributions of the ions and/or cluster ions associated with said first peak and said second peaks, in said mass spectrum data.

4. The computer-implemented method claim 3, wherein deconvoluting the corresponding mass spectrum data includes solving an optimization problem that fits a set of Gaussian functions to the shape of the detected peaks, wherein each Gaussian function is centered on a mass at which a peak has been detected, and each Gaussian function is representative of an ion species/cluster ion that has been associated with said peak.

5. The computer-implemented method claim 1, further including relative quantifying, using said data processing means, the concentration $c_i$ of each species i either detected as a monatomic ion and/or a cluster ion that has been associated with a detected peak in said mass spectrum data, $$c_i = \frac{\sum_{j=1}^{n} \frac{n_{i,j} s_{i,j}}{p_{i,j}}}{\sum_{k=1}^{m} \sum_{l=1}^{q_k} \frac{n_{k,l} s_{k,l}}{p_{k,l}}},$$

wherein $p_{i,j}$ are the ionization probabilities of the monatomic or cluster ion j, $n_{i,j}$ is a number of atoms of species i in a secondary monatomic or cluster ion j, and $s_{i,j}$ is an intensity of the monatomic or cluster ion in j, wherein a sum over j includes only monatomic or cluster ions which contain the species i, wherein a sum over k goes over all chemical elements present in the mass spectrum and a sum over l includes all monatomic or cluster ions which contain the element k, wherein $q_k$ is a number of monatomic or luster ions containing element k;

wherein the ionization probabilities $p_{i,j}$ are computed by the data processing means using, for negative monatomic or cluster ions:

$$p_i = p_0 \cdot \exp\left(\frac{\chi_{i,SIMS} + EA_{i,SIMS} - \chi_{Cs}}{\epsilon_{\chi,A}}\right),$$

wherein $p_i$ is an ionization probability of the monatomic or cluster ion i, and $p_0$ is a constant equal to $9.5 \times 10^{-7}$, wherein $\chi_{i,SIMS}$ is electronegativity corrected for SIMS, wherein $EA_{i,SIMS}$ is an electron affinity that has been obtained experimentally, wherein $\chi_{Cs}$ is an electron affinity of the ion species used as primary beam in the SIMS instrument used for obtaining the mass spectrum data, wherein the ionization probabilities $p_{i,j}$ are computed by the data processing means using, for positive monatomic or cluster ions:

$$p_i = p_0 \cdot \exp\left(\frac{\Psi_{i,SIMS} + I_{i,SIMS} - \Psi_O}{\epsilon_{\Psi,I}}\right).$$

wherein, $p_0$ is a constant equal to $9.5 \times 10^{-7}$ and $\epsilon_{\Psi,I}$ is a characteristic energy, wherein $\Psi_{i,SIMS}$ is electropositivity corrected for SIMS, wherein $I_{i,SMIS}$ is an ionization energy and wherein $\psi_O$ is an electropositivity of the ion species used as a primary beam in the SIMS instrument used for obtaining the mass spectrum data.

6. The computer-implemented method claim 1, further including absolute quantifying, using said data processing means, the concentration $c_i$ of each species i either detected as a monatomic ion and/or a cluster ion that has been associated with a detected peak in said mass spectrum data, $$c_i = \frac{\sum_{j=1}^{n} \frac{n_{i,j} s_{i,j}}{p_{i,j}}}{V},$$

wherein V is a volume of material sputtered during the detection of the monatomic or cluster ion i, wherein $p_{i,j}$ are the ionization probabilities of the monatomic or cluster ion j, $n_{i,j}$ is a number of atoms of species i in a secondary monatomic or cluster ion j, and $s_{i,j}$ is an intensity of the monatomic or cluster ion in j, wherein a sum over j includes only monatomic or cluster ions which contain the species i, wherein a sum over k goes over all chemical elements present in the mass spectrum and a sum over l includes all monatomic or cluster ions which contain the element k, wherein $q_k$ is a number of monatomic or cluster containing element k;

wherein the ionization probabilities $p_{i,j}$ are computed by the data processing means using, for negative monatomic or cluster ions:

$$p_i = p_0 \cdot \exp\left(\frac{\chi_{i,SIMS} + EA_{i,SIMS} - \chi_{Cs}}{\epsilon_{\chi,A}}\right),$$

wherein $p_i$ is an ionization probability of the monatomic or cluster ion i, $p_0$ is a constant equal to $9.5 \times 10^{-7}$,
wherein $\chi_{i,SIMS}$ is electronegativity corrected for SIMS,
wherein $EA_{i,SIMS}$ is an electron affinity that has been obtained experimentally, wherein
$\chi_{cs}$ is an electron affinity of the ion species used as primary beam in the SIMS instrument used for obtaining the mass spectrum data,
wherein the ionization probabilities $p_{i,j}$ are computed by the data processing means using, for positive monoatomic or cluster ions:

$$p_i = p_0 \cdot \exp\left(\frac{\Psi_{i,SIMS} + I_{i,SIMS} - \Psi_O}{\epsilon_{\Psi,I}}\right),$$

wherein, $p_0$ is a constant equal to $9.5 \times 10^{-7}$ and $\epsilon_{\psi,i}$ is a characteristic energy,
wherein $\Psi_{i,SIMS}$ is electropositivity corrected for SIMS,
wherein $I_{i,SIMS}$ is an ionization energy and wherein $\Psi_O$ is an electropositivity of the ion species used as a primary beam in the SIMS instrument used for obtaining the mass spectrum data.

7. The computer-implemented method according of claim 1, wherein prior to detecting peaks using the data processing means, a smoothing filter is applied to said mass spectrum data, wherein detecting peaks and associating each of the detected peaks are applied on said resulting smoothed spectrum data.

8. The computer-implemented method of claim 7, wherein said smoothing filter preserves peaks in the spectrum data while ensuring that a first and a second derivative of the smoothed spectrum data exist.

9. The computer-implemented method of claim 7, wherein said smoothing filter is a Savitzky-Golay filter.

10. The computer-implemented method of claim 7, wherein identification of a peak in said smoothed spectrum data comprises an identification of masses for which a second derivative of said smoothed spectrum data presents a local minimum.

11. The computer-implemented method of claim 1, wherein said mass spectrum data is aggregated data obtained for a plurality voxels of said sample.

12. The computer-implemented method of claim 1, wherein said mass spectrum data has been obtained using a SIMS instrument comprising a magnetic sector analyzer.

13. The computer-implemented method of claim 1, wherein said mass spectrum data has been obtained using a detector assembly capable of detecting ions within a range of charge/mass ratios.

14. A secondary ion mass spectrum data analyzing device, the mass spectrum data having been obtained by Secondary Ion Mass Spectrometry, SIMS, of at least one voxel of a sample and representing respective secondary ion counts for a range of masses at a given mass resolution, the device comprising data processing means and at least one memory element, the data processing means being configured for:

detecting peaks in said mass spectrum data, which is pre-provided in said memory element, and storing the corresponding mass for each detected peak in a memory element;

associating each detected peak with ion species and/or cluster ions having a corresponding mass, the correspondences between masses and ion species/cluster ions being pre-recorded in a memory element, and storing the result in a memory element;

wherein associating each detected peak is performed by order of increasing mass, and wherein associating each detected peak includes associating a peak at a given mass that corresponds to a plurality of cluster ions with a selection of these cluster ions, wherein the selection depends on the previous association of peaks at lower masses with at least part of the constituent ions of these cluster ions.

15. The secondary ion mass spectrum analyzing device of claim 14, wherein the data processing means are further configured to execute relative quantifying, using said data processing means the concentration $c_i$ of each species i either detected as a monatomic ion and/or a cluster ion that has been associated with a detected peak in said mass spectrum data, $$c_i = \frac{\sum_{j=1}^n \frac{n_{i,j} s_{i,j}}{p_{i,j}}}{\sum_{k=1}^m \sum_{l=1}^{q_k} \frac{n_{k,l} s_{k,l}}{p_{k,l}}},$$

wherein $p_{i,j}$ are the ionization probabilities of the monatomic or cluster ion j,
$n_{i,j}$ is a number of atoms of species i in a secondary monatomic or cluster ion j, and
$s_{i,j}$ is an intensity of the monatomic or cluster ion in j,
wherein a sum over j includes only monatomic or cluster ions which contain the species i, wherein a sum over k goes over all chemical elements present in the mass spectrum and a sum over l includes all monatomic or cluster ions which contain the element k,
wherein $q_k$ is a number of monatomic or cluster ions containing element k;
wherein the ionization probabilities $p_{i,j}$ are computed by the data processing means using, for negative monoatomic or cluster ions:

$$p_i = p_0 \cdot \exp\left(\frac{\chi_{i,SIMS} + EA_{i,SIMS} - \chi_{Cs}}{\epsilon_{\chi,A}}\right),$$

wherein $p_i$ is an ionization probability of the monatomic or cluster ion i, and $p_0$ is a constant equal to $9.5 \times 10^{-7}$,
wherein $\chi_{i,SIMS}$ is electronegativity corrected for SIMS,
wherein $EA_{i,SIMS}$ is an electron affinity that has been obtained experimentally,
wherein
$\chi_{cs}$ is an electron affinity of the ion species used as primary beam in the SIMS instrument used for obtaining the mass spectrum data,
wherein the ionization probabilities $p_{i,j}$ are computed by the data processing means using, for positive monoatomic or cluster ions:

$$p_i = p_0 \cdot \exp\left(\frac{\Psi_{i,SIMS} + I_{i,SIMS} - \Psi_O}{\epsilon_{\Psi,I}}\right),$$

wherein, $p_0$ is a constant equal to $9.5 \times 10^{-7}$ and $\epsilon_{\Psi,I}$ is a characteristic energy, wherein $\Psi_{i,SIMS}$ is electropositivity corrected for SIMS, wherein $I_{i,SIMS}$ is an ionization energy and wherein $\Psi_O$ is an electropositivity of the ion species used as a primary beam in the SIMS instrument used for obtaining the mass spectrum data.

16. A non-transitory computer readable storage medium storing instructions that when executed by a computer, which includes a processor perform a method for analyzing secondary ion mass spectrum data representing respective secondary ion counts for a range of masses at a given mass resolution, said mass spectrum data having been obtained by Secondary Ion Mass Spectrometry, SIMS, of at least one voxel of a sample, wherein the method comprises the steps of:

detecting peaks using a data processing means in said mass spectrum data and storing a corresponding mass for each detected peak in a first memory element; and associating each of the detected peaks using data processing means with ion species and/or cluster ions that have a corresponding mass, wherein the correspondences between masses and ion species/cluster ions are pre-recorded in a second memory element and a result is stored on a third memory element, wherein associating each of the detected peaks is performed by order of increasing mass, wherein associating each detected peak includes associating said peak at a given mass that correspond to a plurality of cluster ions, with a selection of these cluster ions, wherein cluster ions comprising constituent ions that have been associated with peaks at lower masses are selected.

17. The non-transitory computer readable storage medium of claim 16 further including:

relative quantifying, using said data processing means, the concentration $c_i$ of each species i either detected as a monatomic ion and/or a cluster ion that has been associated with a detected peak in said mass spectrum data, $$c_i = \frac{\sum_{j=1}^{n} \frac{n_{i,j} s_{i,j}}{p_{i,j}}}{\sum_{k=1}^{m} \sum_{l=1}^{q_k} \frac{n_{k,l} s_{k,l}}{p_{k,l}}},$$

wherein $p_{i,j}$ are the ionization probabilities of the monatomic or cluster ion j, $n_{i,j}$ is a number of atoms of species i in a secondary monatomic or cluster ion j, and $s_{i,j}$ is an intensity of the monatomic or cluster ion in j, wherein a sum over j includes only monatomic or cluster ions which contain the species i, wherein a sum over k goes over all chemical elements present in the mass spectrum and a sum over l includes all monatomic or cluster ions which contain the element k, wherein $q_k$ is a number of monatomic or cluster ions containing element k;

wherein the ionization probabilities $p_{i,j}$ are computed by the data processing means using, for negative monatomic or cluster ions:

$$p_i = p_0 \cdot \exp\left(\frac{\chi_{i,SIMS} + EA_{i,SIMS} - \chi_{Cs}}{\epsilon_{\chi,A}}\right),$$

wherein $p_i$ is an ionization probability of the monatomic or cluster ion i, and $p_0$ is a constant equal to $9.5 \times 10^{-7}$, wherein $\chi_{i,SIMS}$ is electronegativity corrected for SIMS, wherein $EA_{i,SIMS}$ is an electron affinity that has been obtained experimentally, wherein $\chi_{cs}$ is an electron affinity of the ion species used as primary beam in the SIMS instrument used for obtaining the mass spectrum data, wherein the ionization probabilities $p_{i,j}$ are computed by the data processing means using, for positive monatomic or cluster ions:

$$p_i = p_0 \cdot \exp\left(\frac{\Psi_{i,SIMS} + I_{i,SIMS} - \Psi_O}{\epsilon_{\Psi,I}}\right),$$

wherein, $p_0$ is a constant equal to $9.5 \times 10^{-7}$ and $\epsilon_{\Psi,I}$ is a characteristic energy, wherein $\Psi_{i,SIMS}$ is electropositivity corrected for SIMS, wherein $I_{i,SIMS}$ is an ionization energy and wherein $\Psi_O$ is an electropositivity of the ion species used as a primary beam in the SIMS instrument used for obtaining the mass spectrum data.

\* \* \* \* \*